United States Patent
Tajima et al.

(10) Patent No.: US 11,687,057 B2
(45) Date of Patent: Jun. 27, 2023

(54) SERVO MOTOR CONTROLLER

(71) Applicant: FANUC CORPORATION, Yamanashi (JP)

(72) Inventors: Daisuke Tajima, Yamanashi (JP); Yuuki Morita, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 343 days.

(21) Appl. No.: 16/983,206

(22) Filed: Aug. 3, 2020

(65) Prior Publication Data

US 2021/0041848 A1 Feb. 11, 2021

(30) Foreign Application Priority Data

Aug. 5, 2019 (JP) ................................. 2019-143559

(51) Int. Cl.
*H02P 6/21* (2016.01)
*H02P 6/14* (2016.01)
(Continued)

(52) U.S. Cl.
CPC ............. *G05B 19/404* (2013.01); *B23Q 1/70* (2013.01); *G05B 2219/41004* (2013.01); *G05B 2219/41006* (2013.01)

(58) Field of Classification Search
CPC .................................. H02P 21/09; H02P 7/04
See application file for complete search history.

(56) References Cited

U.S. PATENT DOCUMENTS

| 2012/0229069 A1* | 9/2012 | Ohta ........................ H02P 3/00 318/601 |
| 2018/0175751 A1* | 6/2018 | Yoshida .................... H02P 3/14 |
| 2020/0169202 A1* | 5/2020 | Kim ........................ H02P 21/18 |

FOREIGN PATENT DOCUMENTS

| JP | 4099503 B2 | 6/2008 |
| JP | 2012-191675 A | 10/2012 |

(Continued)

*Primary Examiner* — Kawing Chan
*Assistant Examiner* — Charles S Laughlin
(74) *Attorney, Agent, or Firm* — Studebaker & Brackett PC

(57) ABSTRACT

To provide a servo motor controller that can quickly and effectively stop an industrial machine at a particular position even if operation speed is relatively low when a fixed position stop command is issued. The servo motor includes a speed comparison unit configured to compare speed at a time of a fixed position stop command with a first speed, a fixed position stop operation determination unit configured to determine an operation method at the time of the fixed position stop command, and a fixed position stop control unit configured to control the servo motor based on the determined operation method. When speed at the time of the fixed position stop command is higher than the first speed, the fixed position stop operation determination unit decelerates the speed to a second speed lower than the first speed and creates a move command for stopping at a target position based on an acceleration rate during deceleration or a predetermined acceleration rate and, when speed at the time of the fixed position stop command is lower than the first speed, decelerates the speed by a predetermined deceleration rate and creates a move command for stopping at a target stop position, and the fixed position stop control unit controls the servo motor based on the move command.

2 Claims, 5 Drawing Sheets

(51) Int. Cl.
    *G05B 19/404*     (2006.01)
    *B23Q 1/70*     (2006.01)

(56) References Cited

FOREIGN PATENT DOCUMENTS

| | | |
|---|---|---|
| JP | 2017-022810 A | 1/2017 |
| JP | 2018-134709 A | 8/2018 |

\* cited by examiner

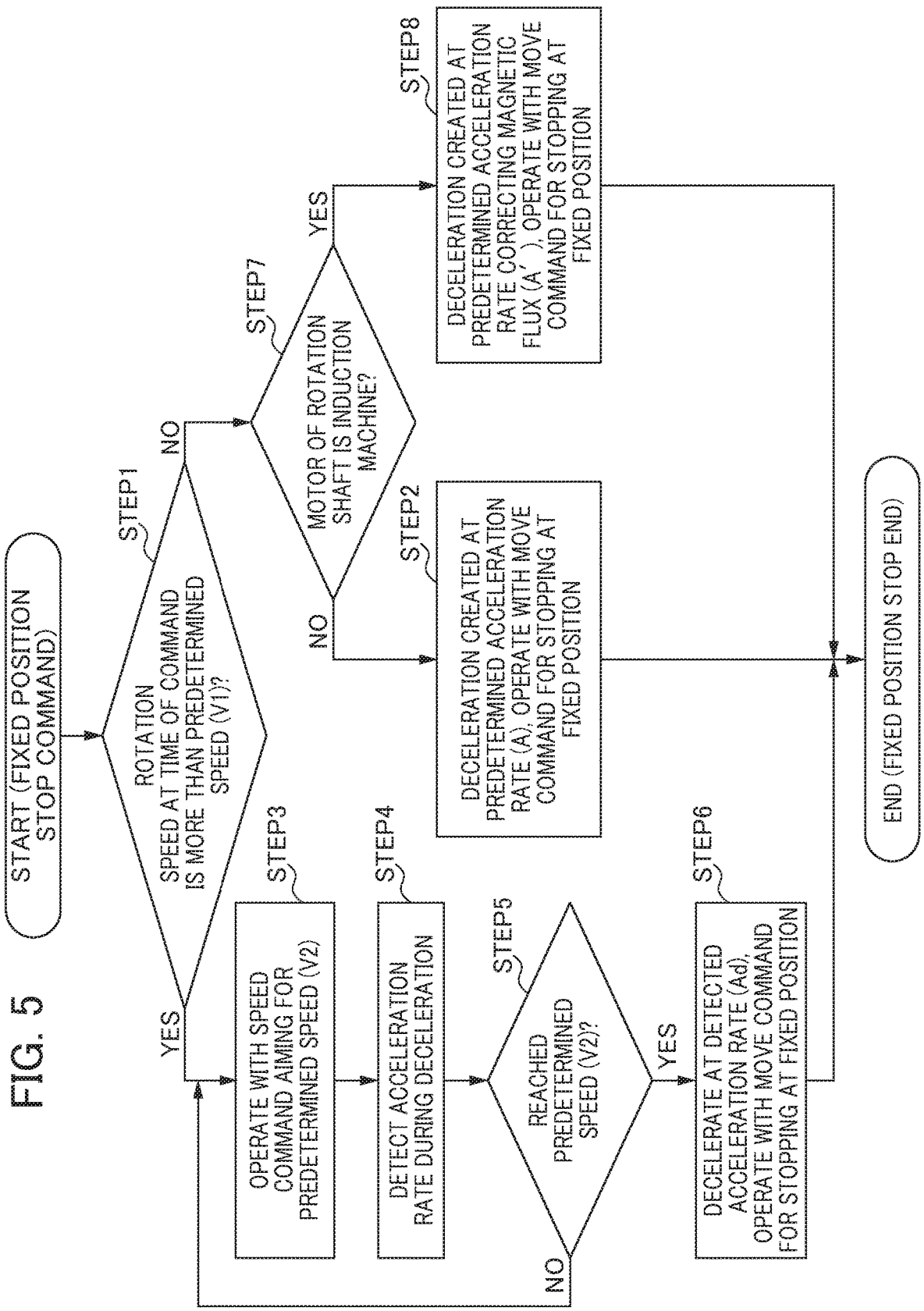

SERVO MOTOR CONTROLLER

This application is based on and claims the benefit of priority from Japanese Patent Application No. 2019-143559, filed on 5 Aug. 2019, the content of which is incorporated herein by reference.

BACKGROUND OF THE INVENTION

Field of the Invention

The present invention relates to a servo motor controller.

Related Art

Drive of a servo motor for an industrial machine, such as a servo motor used for driving a spindle in a machine tool, is drive-controlled in terms of amount of rotation, speed and torque. A controller for a servo motor uses a detector to detect the position and pole position (phase (angle) of a motor magnet) of the servo motor and determines a voltage command value based on various feedback values output from the detector. Then, the controller applies a voltage modulated by pulse width modulation (PWM) to drive-control the servo motor.

One example of a method utilized for controlling an operation for stopping an industrial machine at a particular position, that is, an orientation (stopping at a particular position) operation is a method of receiving an orientation command, flowing maximum current through the servo motor to perform a maximum deceleration control operation, detecting the maximum deceleration acceleration rate and acquiring a status value at which the industrial machine stops earliest. A command used for stopping the industrial machine at a particular position is created based on this status value and drive control of the servo motor is performed based on this command.

For example, Patent Document 1 discloses "A fixed-position stop control apparatus for a rotation shaft, including: a speed loop control means adapted for speed controlling the rotation shaft according to one of a first speed instruction having a first speed created by a higher level control apparatus and a second speed instruction having a second speed, which is smaller than the first speed, a move-instruction creation means adapted for creating a move instruction for each control cycle, a position loop control means adapted for position controlling the rotation shaft for each control cycle according to the move instruction created by the move-instruction creation means, a changeover unit adapted to change over so as to select one of a speed instruction created by the position loop controller, the second, predetermined speed instruction, stored in advance in a storage and the speed instruction created by the higher level control apparatus, characterized in that the fixed-position stop control apparatus includes an acceleration detecting means adapted for detecting an acceleration of the rotation shaft during acceleration or deceleration, in which the changeover unit is adapted to, when the rotation shaft needs to be stopped, change from the speed control of the rotation shaft based on the first speed instruction created by the higher level control apparatus to the speed control of the rotation shaft based on the second speed instruction of the speed loop control means, in which the changeover unit is adapted to, when the speed of the rotation shaft reaches the second speed, change from the speed control of the rotation shaft based on the second speed instruction of the speed loop control means to the position control of the rotation shaft by the position loop control means, and in which the move instruction created by the move-instruction creation means immediately after the changeover unit changes from the speed control of the rotation shaft based on the second speed instruction of the speed loop control means to the position control of the rotation shaft by the position loop control means, includes an acceleration detected by the acceleration detecting means immediately before the changeover unit changes from the speed control to the position control."

Patent Document 1: Japanese Patent No. 4099503

SUMMARY OF THE INVENTION

In the orientation control method described above, because maximum current is flowed through the servo motor to perform a maximum deceleration control operation and detect the maximum deceleration acceleration rate, if the operation speed of the industrial machine is high when the orientation command is issued, the time required to perform the maximum deceleration control operation and detect the maximum deceleration acceleration can be secured, and the industrial machine can be stopped at a particular position quickly and effectively (at is possible to create a command for stopping the industrial machine at a particular position).

On the other hand, if the operation speed of the industrial machine is relatively low when the orientation command is issued, it takes time (manpower) to perform the maximum deceleration control operation and detect the maximum deceleration acceleration rate, which may result in a longer amount of time until the industrial machine is stopped at the particular position and thus a decrease in yield.

As a result, there has been a strong demand for a method that makes it possible to quickly and effectively stop an industrial machine at a particular position even if the operation speed of the industrial machine is relatively low when the orientation command is issued.

One aspect of a controller for a servo motor according to the present disclosure is a servo motor controller used for controlling a servo motor configured to drive a rotating shaft and for controlling a fixed position stop operation, the servo motor controller including a speed detection unit configured to detect speed of the rotating shaft, a speed setting storage unit configured to set and store a first speed and a second speed lower than the first speed, a speed comparison unit configured to compare speed at a time of a fixed position stop command with the first speed, a fixed position stop operation determination unit configured to determine an operation method at the time of the fixed position stop command based on a result of comparison by the speed comparison unit, and a fixed position stop control unit configured to control the servo motor based on an operation method determined by the fixed position stop operation determination unit, the fixed position stop operation determination unit including a speed command creation unit and a move command creation unit configured to, when the result of comparison indicates that speed at the time of the fixed position stop command is higher than the first speed, create a speed command for decelerating to the second speed at a maximum torque and a move command for stopping at a target position based on an acceleration rate during deceleration determined from the speed detected by the speed detection unit or a predetermined acceleration rate set in advance and, when the result of comparison indicates that speed at the time of the fixed position stop command is lower than the first speed, create a speed command for decelerating at a predetermined deceleration rate and a move command for stopping at a target stop position based on the speed command, the fixed position stop control unit controlling the servo motor based on the speed command and the move command created by the speed command creation unit and the move command creation unit.

With the one aspect of a controller for a servo motor according to the present disclosure, it is possible to quickly and effectively stop an industrial machine at a particular position even when operation speed of the industrial machine when an orientation command is output is relatively slow. In other words, an orientation operation can be performed more quickly.

BRIEF DESCRIPTION OF THE DRAWINGS

FIG. 5 is a flowchart illustrating fixed position stop operation control when using the controller for a servo motor according to the second embodiment according to one aspect.

DETAILED DESCRIPTION OF THE INVENTION

A controller for a servo motor according to one embodiment will be described below with reference to FIGS. 1 to 5.

The present embodiment relates to a servo motor controller that controls a servo motor (rotating shaft of industrial machine) that drives a spindle of a machine tool, e.g., suitably controls an orientation (stopping at a particular position) operation of stopping a spindle position at a particular position at which the spindle can be replaced when it is time to replace a tool. The servo motor controller according to the present disclosure need only be able to control the orientation operation of an industrial machine including a servo motor (rotating shaft) and is not limited to controlling a machine tool. The servo motor controller may be applied to drive control of a servo motor in another type of industrial machine, such as a robot, a transport machine, a measurement instrument, a testing device, a pressing machine, a press-fitting machine, a printer, a die casting machine, an injection molding machine, a food preparation machine, a packaging machine, a welding machine, a cleaning machine, a painting machine, an assembly device, a mounting machine, a woodworking machine, a sealing device, or a cutting tool.

Figure 1:
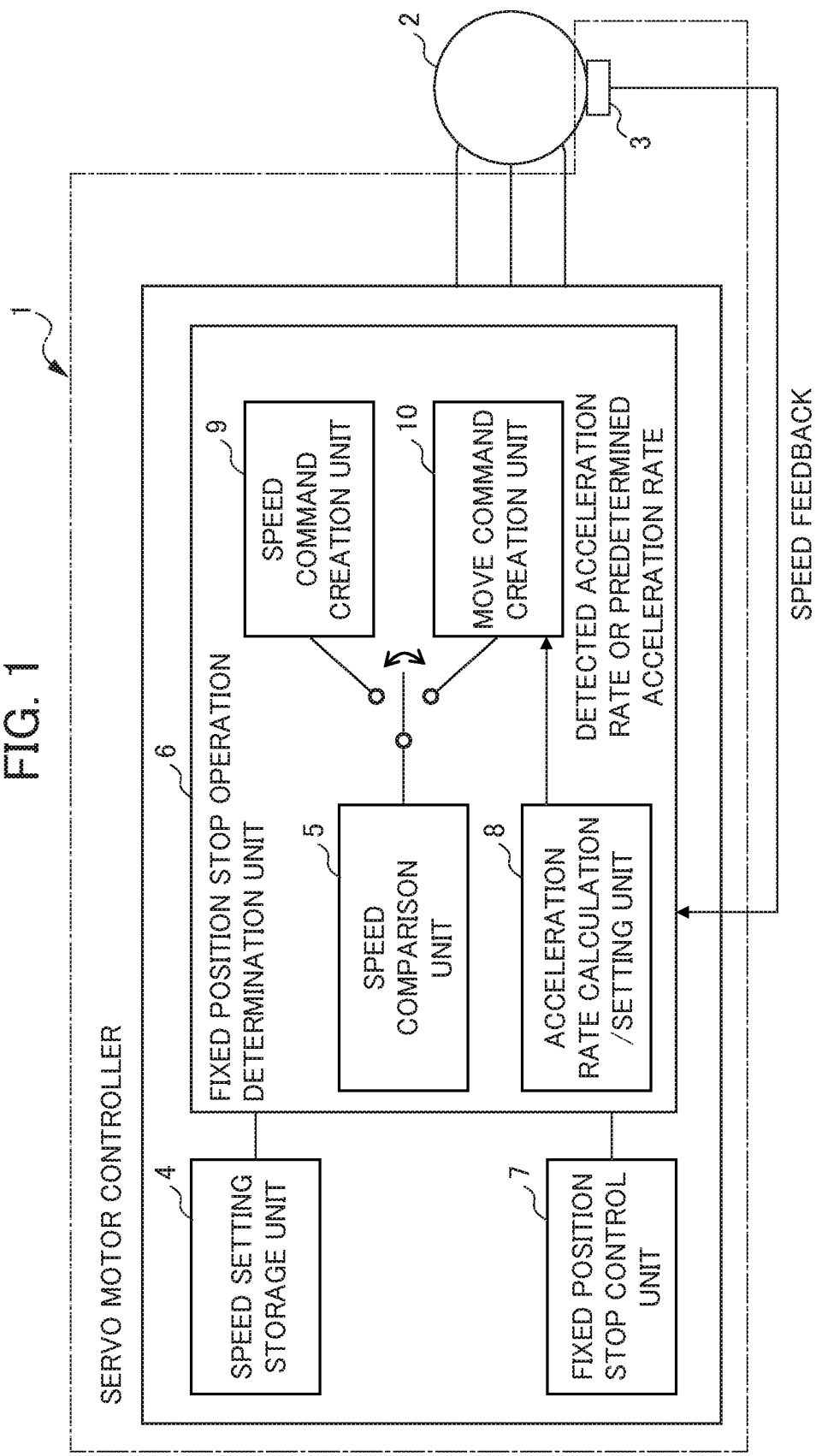
FIG. 1 is a block diagram illustrating a controller for a servo motor according to a first embodiment according to one aspect.

First, as illustrated in FIG. 1, a control system of the machine tool according to the present embodiment includes a servo motor controller 1 used to control a servo motor 2 that drives the spindle (rotating axis) of a machine tool based on a computerized numerical control (CNC) command output from a command unit, and control an orientation (stopping at a particular position) operation.

Example 1

Figure 2:
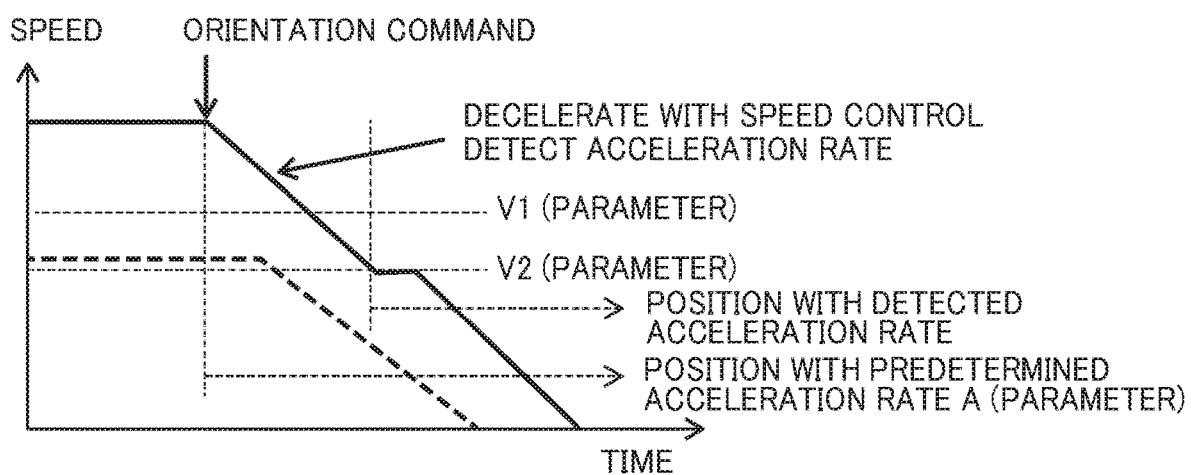
FIG. 2 is a diagram illustrating fixed position stop operation control when using a controller for a servo motor according to one aspect.

As illustrated in FIGS. 1 and 2, the servo motor controller 1 according to a "First example" of the present embodiment includes a speed detection unit 3 configured to detect speed of a spindle driven by the servo motor 2, a speed setting storage unit 4 configured to set and store a first speed (parameter) V1 and a second speed (target speed: parameter) V2 lower than the first speed V1, a speed comparison unit 5 configured to compare speed at the time of the orientation command (at the time of the fixed position stop command) with the first speed V1, a fixed position stop operation determination unit 6 configured to determine an operation method of the servo motor 2 at the time of the orientation command based on results of comparison by the speed comparison unit 5, and a fixed position stop control unit 7 configured to control the servo motor 3 based on the operation method determined by the fixed position stop operation determination unit 6. As illustrated in FIG. 1, in the present embodiment, the fixed position stop operation determination unit 6 is configured to include the speed comparison unit 5.

As illustrated in FIGS. 1 and 2, the fixed position stop operation determination unit 6 includes an acceleration rate calculation/setting unit 8 configured to determine an acceleration rate based on speed detected by the speed detection unit 3 or set and store a predetermined acceleration rate in advance, a speed command creation unit 9 configured to create a speed command, and a move command creation unit 10 configured to create a move command.

When the speed comparison unit 5 obtains a result of comparison indicating that the speed at the time of the orientation stop command is higher than the first speed V1, the speed command creation unit 9 and the move command creation unit 10 create a speed command for decelerating to the second speed V2 using maximum torque and a move command for stopping at a target position based on an acceleration rate during deceleration calculated by the acceleration rate calculation/setting unit 8 or a predetermined acceleration rate set in advance.

When the speed comparison unit 5 obtains a result of comparison indicating that the speed at the time of the orientation stop command is lower than the first speed V1, the speed command creation unit 9 and the move command creation unit 10 create a speed command for decelerating at a predetermined deceleration rate and a move command for stopping at a target, stop position based on the speed command.

In the servo motor controller 1 according to the present embodiment, the fixed position stop control unit 7 controls the servo motor 2 based on the speed command created by the speed command creation unit 9 and the move command creation unit 10 and the move command.

Figure 3:
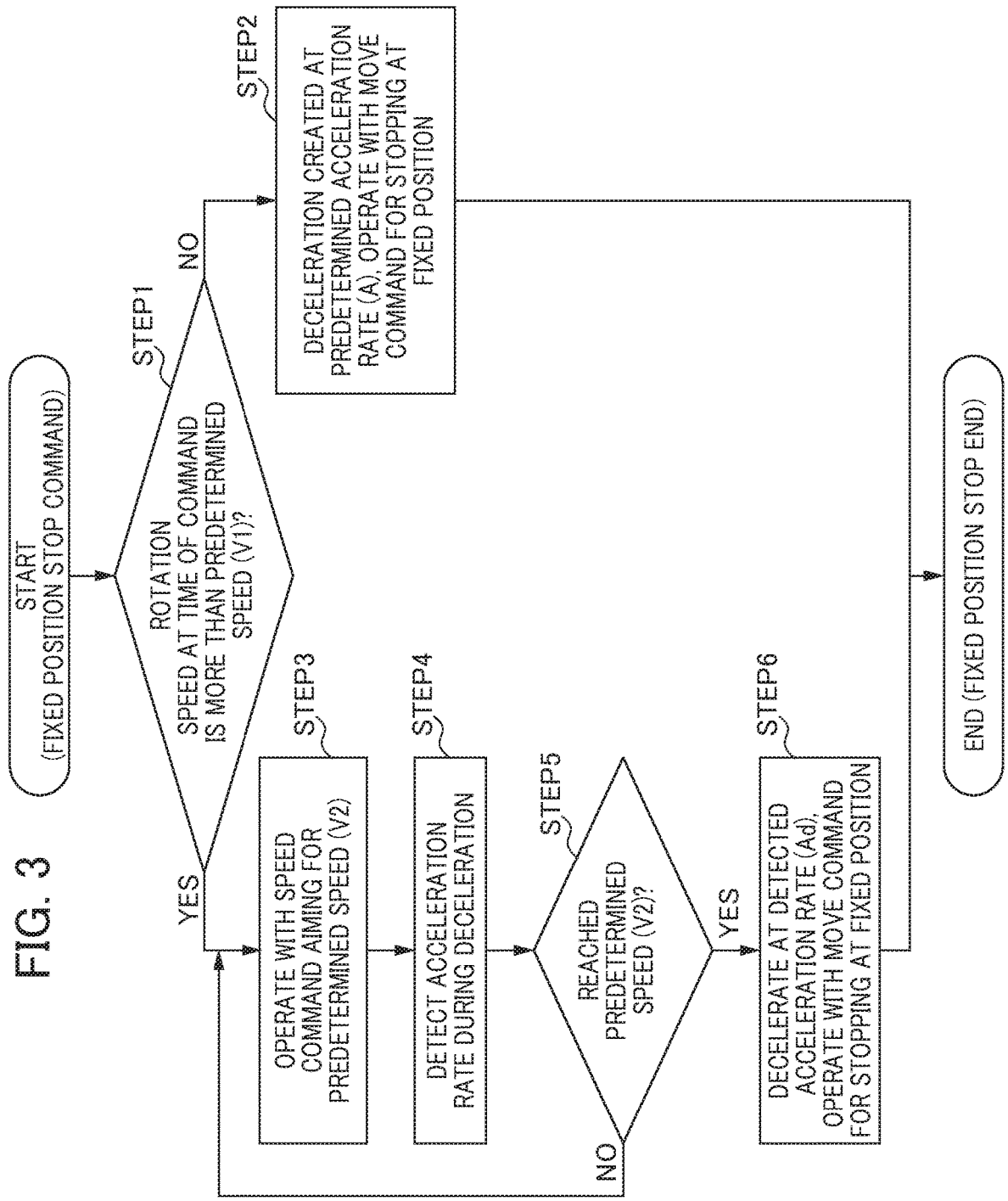
FIG. 3 is a flowchart illustrating fixed position stop operation control when using the controller for a servo motor according to the first embodiment according to one aspect.

More specifically, as illustrated in FIG. 3 (FIGS. 1 and 2), when controlling the orientation operation using the servo motor controller 1 of the "First Example" according to the present embodiment, when an orientation command (fixed position stop command) is output from the CNC, the speed comparison unit 5 checks whether rotation speed of the spindle at the time of the orientation command detected by the speed detection unit 3 is more than or equal to the first speed V1 set and stored in the speed setting storage unit 4 (STEP 1).

If the result of comparison by the speed comparison unit 5 is less than the first speed V1, the move command created by the move command creation unit 10 is output, and the fixed position stop control unit 7 controls operation of the servo motor 2 based on a predetermined acceleration rate A set and stored in advance in the acceleration rate calculation/ setting unit 8, i.e., controls deceleration of rotation speed of the spindle and stops the industrial machine at a fixed position (STEP 2).

If the result of comparison by the speed comparison unit 5 is equal to or more than the first speed V1, the speed command creation unit 9 creates the speed command aiming for the second speed (target speed) V2 set and stored in the speed setting storage unit 1, and the move command creation unit 10 creates the move command for stopping at the target position based on an acceleration rate during deceleration determined by the acceleration rate calculation/setting unit 8 or a predetermined acceleration rate set in advance.

At this time, because the speed decelerates to the second speed V2 shortly after the orientation command is output, the speed command is created such that the speed decelerates to the second speed V2 at maximum torque unique to the servo motor 2.

The maximum torque unique to the servo motor 2 varies depending on differences in inertia. Thus, the speed command is created such that the speed decelerates to the second speed V2 at an appropriate maximum torque according to the state at the time of the orientation command.

The move command created as described above (move command based on the speed command) is output to the fixed position stop control unit 7 to control drive of the servo motor (STEP 3). Further, the acceleration rate during deceleration based on the move command is determined by the acceleration rate calculation/setting unit 8 (STEP 4). Then, whether the speed detected by the speed detection unit 3 has reached the second speed V2 is confirmed (STEP 5).

If the speed detected by the speed detection unit 3 has not reached the second speed V2, deceleration drive control for the servo motor 2 based on the move command is continued, and an acceleration rate during deceleration is calculated to check if the speed has reached the second speed V2 (STEP 3, STEP 4, STEP 5).

If the speed detected by the speed detection unit 3 has reached the second speed 72, deceleration control based on the move command is stopped and, at this time, a move command for stopping at a fixed position based on an acceleration rate Ad detected at this time is created, drive of the servo motor 2 is controlled based on the move command, and the industrial machine is stopped at the fixed position (STEP 6).

Example 2

Figure 4:
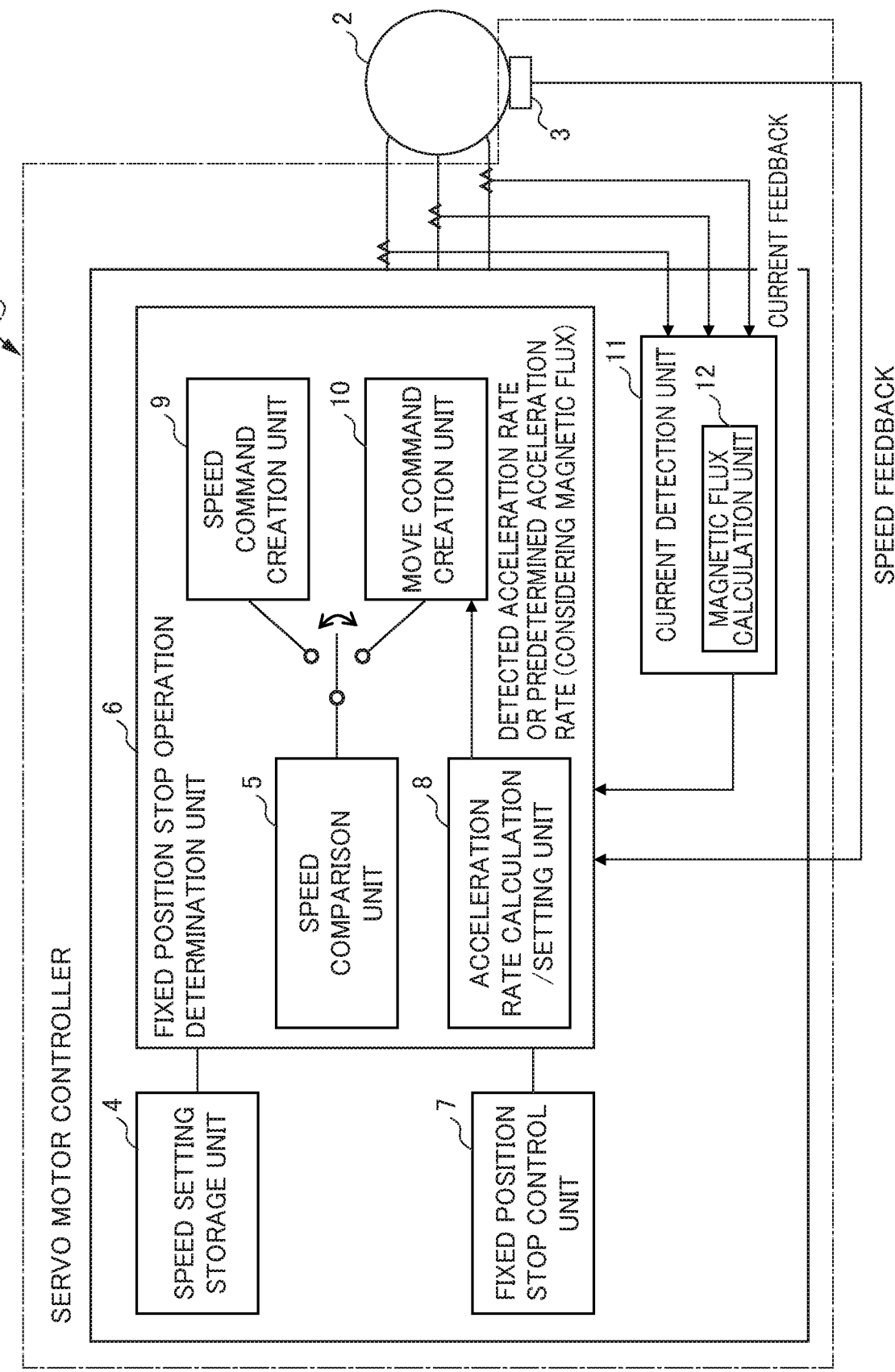
FIG. 4 is a block diagram illustrating a controller for a servo motor according to a second embodiment according to one aspect.

As illustrated in FIG. 4, if the servo motor 2 is an induction machine, the servo motor controller 1 of a "Second Example" according to the present embodiment includes, in addition to the speed detection unit 3, the speed setting storage unit 4, the speed comparison unit 5 (fixed position stop operation determination unit 6), the fixed position stop control unit 7, the acceleration rate calculation/ setting unit 8 (fixed position stop operation determination unit 6), the speed command creation unit 9 (fixed position stop operation determination unit 6), the move command creation unit 10 (fixed position stop operation determination unit 6), a current detection unit 11 configured to detect a current value of the servo motor 2 and a magnetic flux calculation unit 12 configured to determine magnetic flux from the current value detected by the current detection unit 11.

If the speed at the time of the orientation command is less than the first speed V1 and decelerates to a predetermined acceleration, the speed command creation unit 9 and move command creation unit 10 in this case create a speed command for decelerating to a present deceleration obtained by correcting the preset deceleration based on the magnetic flux at the start of deceleration, and a move command for stopping at a target stop position based on the speed command As illustrated in FIG. 5 (FIGS. 2 and 4), when controlling an orientation operation using the servo motor controller 1 of the "Second Example" according to the present example, first, similar to the "First Example", when an orientation command (fixed position stop command) is output from a CNC, the speed comparison unit 5 sets a rotating speed of the spindle at the time of the orientation command detected by the speed detection unit 3 in the speed setting storage unit 4 and checks whether the rotating speed is more than or equal to the stored first speed V1 (STEP 1).

If the result of comparison by the speed comparison unit 5 is more than or equal to the first speed V1, the speed command creation unit 9 creates a speed command aiming for the second speed (target speed) V2, and the move command creation unit 10 creates a move command for stopping at a target position based on an acceleration rate during deceleration or a predetermined acceleration rate stored in advance.

The created move command (move command based on the speed command) is output to the fixed position stop control unit 7 to control drive of the servo motor 2 (STEP 3). Then, an acceleration rate during deceleration is determined based on this move command (STEP 4) and whether the speed detected by the speed detection unit 3 has reached the second speed V2 is checked (STEP 5).

If the speed detected by the speed detection unit 3 has not reached the second speed V2, acceleration drive control for the servo motor 2 based on the move command is continued, and an acceleration rate during deceleration is calculated to check if the speed has reached the second speed V2 (STEP 3, STEP 4, STEP 5).

If the speed detected by the speed detection unit 3 has reached the second speed V2, a move command for stopping at a fixed position based on the acceleration rate Ad detected at this time is created, drive of the servo motor 2 is controlled based on the move command, and the industrial machine is stopped at the fixed position (STEP 6).

If the result of comparison by the speed comparison unit 5 is less than the first speed V1, whether the servo motor 2 is an induction motor is checked (STEP 7). If the server motor 2 is not an induction motor, the move command created by the move command creation unit 10 is output, and the fixed position stop control unit 7 controls operation of the server motor 2 based on the predetermined acceleration rate A set and stored in advance in the acceleration rate calculation/setting unit 8, i.e., controls deceleration of rotation speed of the spindle and stops the industrial machine at a fixed position (STEP 2).

If the server motor 2 is an induction motor and if the speed at the time of the orientation command is lower than the first speed V1 and is to be decelerated to the predetermined deceleration rate, the speed command creation unit 9 and the move command creation unit 10 create a speed command for decelerating the speed at a predetermined deceleration rate (deceleration rate determined by a predetermined acceleration rate A') obtained by correcting the deceleration set and stored in advance (predetermined acceleration) based on the magnetic flux at the start of deceleration and a move command for stopping at a target stop position based on the speed command.

Then, drive of the servo motor 2 is controlled based on the move command to stop at a fixed position (STEP 8).

Thus, in the servo motor controller 1 according to the present embodiment, it is possible to quickly and effectively stop an industrial machine at a particular position even when operation speed of the industrial machine when an orientation command is output is relatively slow. In other words, an orientation operation can be performed more quickly.

While an embodiment of a servo motor controller has been described above, the present invention is not limited to the above-described embodiment and may be changed as required without departing from the gist of the present invention.

EXPLANATION OF REFERENCE NUMERALS

1 Servo motor controller
2 Servo motor
3 Speed detection unit
4 Speed setting storage unit
5 Speed comparison unit
6 Fixed position stop operation determination unit
7 Fixed position stop control unit
8 Acceleration calculation/setting unit
9 Speed command creation unit
10 Move command creation unit
11 Current detection unit
12 Magnetic flux calculation unit

What is claimed is:

1. A servo motor controller used for controlling a servo motor configured to drive a rotating shaft and for controlling a fixed position stop operation, the servo motor controller comprising:
   a speed detection unit configured to detect speed of the rotating shaft;
   a speed setting storage unit configured to set and store a first speed and a second speed lower than the first speed;
   a speed comparison unit configured to compare speed at a time of a fixed position stop command with the first speed;
   a fixed position stop operation determination unit configured to determine an operation method at the time of the fixed position stop command based on a result of comparison by the speed comparison unit; and
   a fixed position stop control unit configured to control the servo motor based on an operation method determined by the fixed position stop operation determination unit, the fixed position stop operation determination unit including:
   a speed command creation unit and a move command creation unit configured to, when the result of comparison indicates that speed at the time of the fixed position stop command is equal to or higher than the first speed, create a first speed command for decelerating to the second speed at a maximum torque and a first move command for stopping at a target position based on an acceleration rate during deceleration determined from the speed detected by the speed detection unit or a predetermined acceleration rate set in advance; and, when the result of comparison indicates that speed at the time of the fixed position stop command is lower than the first speed, create a second speed command for decelerating at a predetermined deceleration rate and a second move command for stopping at a target stop position based on the speed command,
   the fixed position stop control unit controlling the servo motor based on the first speed command and the first move command or based on the second speed command and the second move command created by the speed command creation unit and the move command creation unit.

2. The servo motor controller according to claim 1, wherein:
   the servo motor is an induction motor,
   the fixed position stop operation determination unit further includes:
   a current detection unit configured to detect current of the induction motor; and
   a magnetic flux calculation unit configured to determine magnetic flux from a current value detected by the current detection unit, and
   when speed at the time of the fixed position stop command is lower than the first speed and is to be decelerated by the predetermined deceleration, the speed command creation unit and the move command creation unit create the second speed command for decelerating by the predetermined deceleration rate obtained by correcting the deceleration rate set in advance based on magnetic flux at the start of deceleration, and the second stop command for stopping at a target stop position based on the second speed command.

* * * * *